US007877490B1

(12) United States Patent
Talagala et al.

(10) Patent No.: US 7,877,490 B1
(45) Date of Patent: Jan. 25, 2011

(54) METHOD AND APPARATUS FOR EFFICIENT TCP CONNECTION HANDOFF

(75) Inventors: Nisha Talagala, Livermore, CA (US); Qing Huang, Menlo Park, CA (US); Rama Chitta, Sunnyvale, CA (US); Martin Patterson, Menlo Park, CA (US)

(73) Assignee: Violin Memory, Inc., Mountain View, CA (US)

( * ) Notice: Subject to any disclaimer, the term of this patent is extended or adjusted under 35 U.S.C. 154(b) by 209 days.

(21) Appl. No.: 11/966,811

(22) Filed: Dec. 28, 2007

(51) Int. Cl.
*G06F 15/16* (2006.01)

(52) U.S. Cl. ................................. 709/227; 709/228
(58) Field of Classification Search .............. 709/203, 709/227–228, 238
See application file for complete search history.

(56) References Cited

U.S. PATENT DOCUMENTS

| 6,182,139 | B1* | 1/2001 | Brendel | 709/226 |
| 7,269,645 | B2* | 9/2007 | Goh et al. | 709/223 |
| 7,552,218 | B2* | 6/2009 | Kaluskar et al. | 709/227 |
| 2003/0195963 | A1* | 10/2003 | Song et al. | 709/227 |
| 2006/0222016 | A1* | 10/2006 | Noel et al. | 370/503 |
| 2008/0104252 | A1* | 5/2008 | Henniger | 709/227 |
| 2008/0189365 | A1* | 8/2008 | Narayanaswami et al. | 709/204 |
| 2009/0254667 | A1* | 10/2009 | Li et al. | 709/228 |

* cited by examiner

*Primary Examiner*—Shawki S Ismail
(74) *Attorney, Agent, or Firm*—Brinks Hofer Gilson & Lione

(57) ABSTRACT

A method for efficient communications with a cluster-based architecture preserves various aspects of integrity throughout one or more connections with a client, even in the midst of connection migration between nodes in the cluster. According to one aspect, the invention provides a mechanism for preventing the loss of packets arising from a TCP connection migration within the cluster. According to another aspect, the invention provides a mechanism for uniquely identifying conflicting TCP connections migrated to a common node. According to a still further aspect, the invention provides a distributed TCP timestamp mechanism so that the sender and receiver will have a consistent view of the timestamp even when each node has different local clock values and regardless of how many times the socket has been migrated.

6 Claims, 11 Drawing Sheets

METHOD AND APPARATUS FOR EFFICIENT TCP CONNECTION HANDOFF

FIELD OF THE INVENTION

The present invention relates to data storage, and more particularly to a method for highly efficient delivery of data via adaptive connections to nodes in a cluster based architecture.

BACKGROUND OF THE INVENTION

Cluster based architectures such as that shown in FIG. 1 are commonly used for high performance I/O and storage systems. In such architectures, each "node" 102 in the cluster 100 provides an access point into storage 104, and storage content is cached and distributed across nodes according to some placement method. Co-pending U.S. application Ser. No. 11/365,474, commonly owned by the present assignee and incorporated by reference herein in its entirety, dramatically advanced the state of the art by providing a high-performance and highly-scalable caching solution with a cluster-based architecture. However, certain opportunities for improvement remain.

For example, in a client-server or initiator-target model (for example a NAS filer), it is considered desirable to allow a client to connect to any node and be able to access any content from storage regardless of its placement among the nodes in the cluster. One common method of making this possible in IP based clusters 100 is sometimes referred to as a TCP/IP "handoff operation" or TCP/IP "connection migration" in which the TCP/IP connection is migrated to the node actually executing the I/O, transparently to the connecting client.

A connection migration operation is illustrated in more detail in FIGS. 2A to 2C. As shown in the illustrative example of FIG. 2A, when client 206 first makes a TCP connection with cluster 200, node 1 handles the connection, and TCP packets are sent back and forth between client 206 and node 1. In a basic TCP connection migration shown in FIG. 2B, for example to allow a different node in cluster 200 to handle an I/O request associated with connection, the TCP connection is migrated from a "target" node (i.e. the original connection node, Node 1 in this example) to a "slave" node (i.e. the migrated node, Node 3 in this example). Any TCP packets sent by client 206 are then forwarded by target node 1 to slave node 3, and slave node 3 directly sends TCP packets related to the connection to client 206. The connection migration is completely transparent to client 206. TCP packets being sent by node 3 to client 206 are specially written to appear as if they were sent from node 1. It should be noted that more than one migration can occur during the active lifetime of a given TCP connection. This is shown in FIG. 2C, where the connection is re-migrated from an "inactive slave" node (Node 3 in this example) to a new "slave" node (Node 5 in this example). Any TCP packets sent from the client 206 are then forwarded internally by target node 1 to slave node 5, and slave node 5 directly sends TCP packets related to the connection to client 206. The TCP connection can also migrate back to and away again from the target node.

Although the prior art discloses certain mechanisms for performing TCP/IP connection migrations such as those described above, there are many challenges to efficiency and performance arising from such operations that are not appreciated and/or adequately addressed by the prior art.

For example, lost packets can occur. More particularly, TCP packets sent by a client can be lost during connection migration and re-migration operations. This can happen when packets are temporarily sent by the target node to a wrong slave node, which ignores it and/or drops it. When a packet is lost, the TCP stream can be slowed due to the need for re-transmission, which can adversely impact performance.

Another potential source of inefficiency is identifying TCP connections. For example, TCP connections are traditionally uniquely identified by a 4-tuple including the source and destination IP addresses and ports. The 4-tuple structure is sufficient to uniquely identify connections between two parties, as is the case with normal TCP. However, when TCP migrations take place, there are at least three parties participating in the connection: the client, the target node and one or more slave nodes. In this scenario, the original 4-tuple is not sufficient to uniquely identify a TCP connection to all parties. Accordingly, there is a need to include additional identifiers to support large numbers and/or simultaneous connection migrations in order to avoid conflicts. This is not possible with conventional connection mechanisms.

A still further potential source of inefficiency is managing client-visible TCP timestamps. The local clocks in the target node and slave nodes may not be completely time synchronized. Meanwhile, the client expects coherent and monotonically increasing timestamps across migrated TCP connection. For example, these timestamps are used in congestion control algorithms that impact performance. If the timestamps seen by the client are not monotonically increasing, performance can suffer and the client may choose to end the connection. One possible solution is to synchronize the clocks on every node that participate in the same connection. So at any time, a timestamp value based on the local clock on every machine can be in sync and useful to both sender and receiver. However it is very hard to achieve very fine grained cluster wide time synchronization in an accurate and reliable way using only software approaches.

Accordingly, a need remains in the art for mechanisms that allow for more efficient delivery of data in a cluster-based architecture.

SUMMARY OF THE INVENTION

The present invention relates generally to a method for efficient communications with a cluster-based architecture, even in the midst of connection migration between nodes in the cluster. According to one aspect, the invention provides a mechanism for preventing the loss of packets arising from a TCP connection migration within the cluster. According to another aspect, the invention provides a mechanism for uniquely identifying conflicting TCP connections migrated to a common node. According to a still further aspect, the invention provides a distributed TCP timestamp mechanism so that the sender and receiver will have a consistent view of the timestamp even when each node has different local clock values and regardless of how many times the socket has been migrated.

In furtherance of these and other aspects, a method according to the invention includes receiving a network connection at a first node of a storage cluster, migrating the connection to a second node of the storage cluster, and ensuring that timestamps associated with the connection continue to monotonically increase after the migration.

In additional furtherance of these and other aspects, a method according to the invention includes receiving a network connection at a first node of a storage cluster, first migrating the connection to a second node of the storage cluster, second migrating the connection to a third node of the storage cluster, and ensuring that packets associated with the connection are not dropped within the storage cluster after the second migration.

In additional furtherance of these and other aspects, a method according to the invention includes receiving a first network connection to a client at a first node of a storage cluster, first migrating the first connection to a second node of the storage cluster, receiving a second network connection to the client at a third node of the storage cluster, second migrating the second connection to the second node of the storage cluster while the first connection is also migrated to the second node, and ensuring that first packets associated with the first network connection do not conflict with second packets associated with the second network connection after the first and second migrations.

In additional furtherance of these and other aspects, a storage apparatus according to the invention includes a first node that receives a network connection to a client, second and third different nodes capable of handling the network connection, a handoff mechanism that causes the network connection to the client to be first migrated from the first node to the second node, and if necessary, second migrated from the second node to the third node, and an application running in the first, second and third nodes that jointly ensures one or more of: that timestamps associated with the connection continue to monotonically increase after the migration, that packets associated with the connection are not dropped within the storage cluster after the second migration, and that packets associated with the network connection do not conflict with other packets associated with a different network connection after the first migration, and after a concurrent fourth migration of the different network connection to the second node.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain general aspects, the invention provides mechanisms for maintaining high performance communications between a cluster of nodes and clients, even in the midst of migration of connections between nodes in the cluster. In one example application of the principles of the invention that will be described herein, the cluster implements a proxy server for a NAS or SAN storage system, for example. In this example, storage access clients are configured to communicate with the cluster using a virtual IP address and protocols such as TCP/IP and NFS. Techniques such as those described in co-pending U.S. application Ser. No. 11/365,474 can be used to implement aspects of this example application of the principles of the invention. However, it should be noted that the principles of the invention are not limited to this example application, and can be extended to other cluster based architectures where TCP or other connection oriented protocols are used, such as clustered file systems, clustered web proxy servers, etc.

Figure 1:
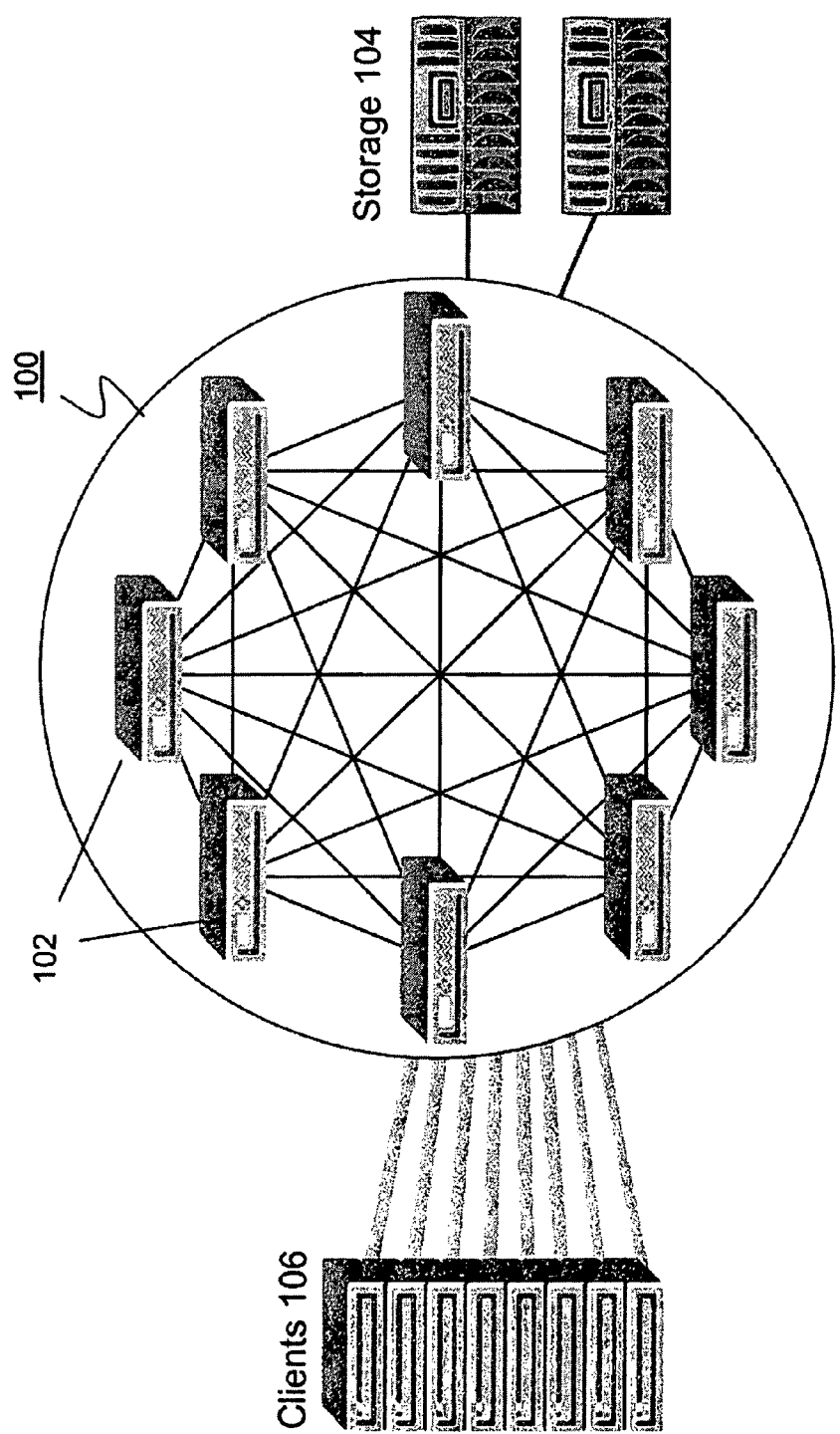
FIG. 1 is a block diagram illustrating certain aspects of conventional cluster-based architectures.
Figure 2A:
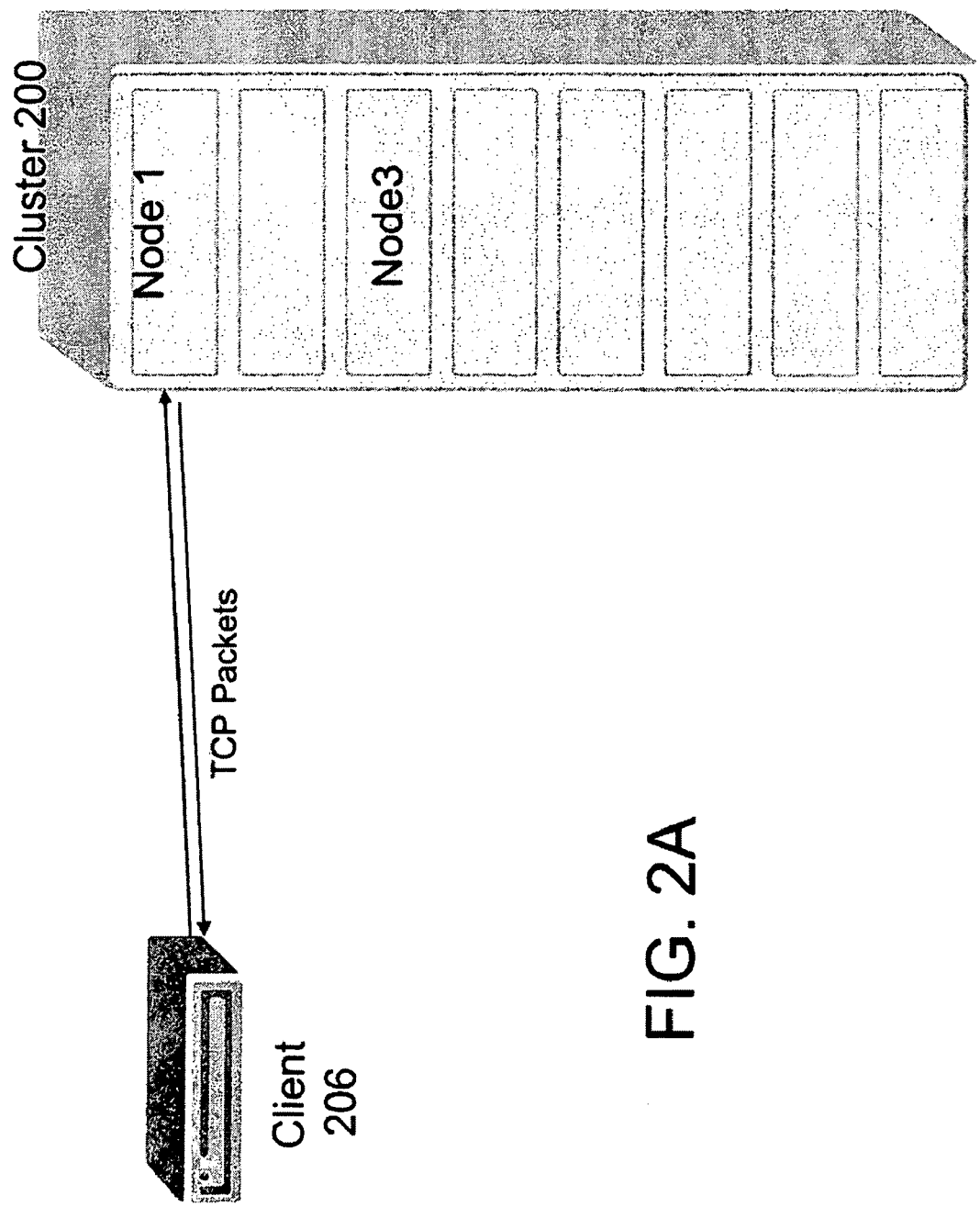
FIGS. 2A to 2C illustrates certain aspects of connection migration in a cluster-based client-server architecture.
Figure 2B:
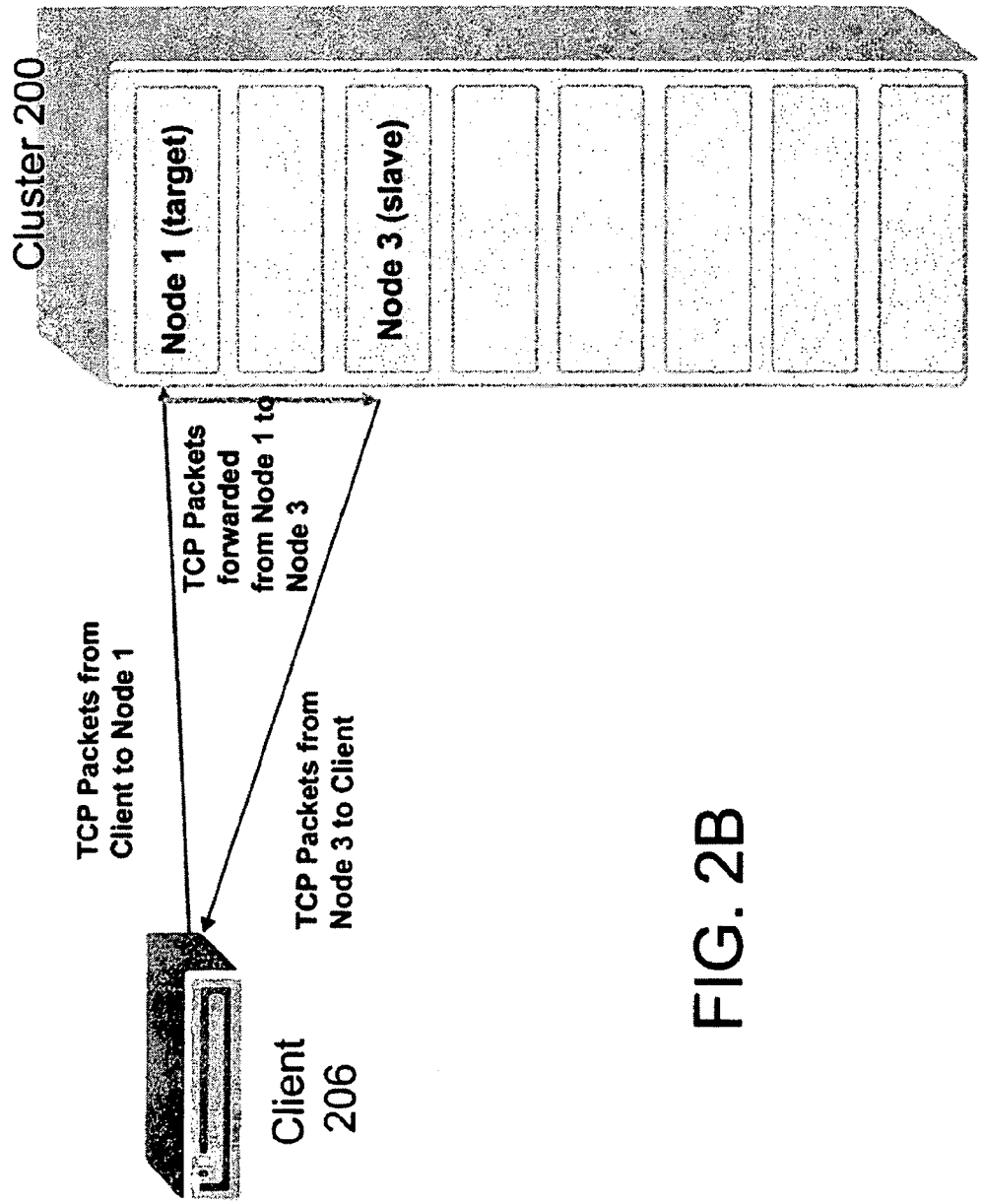
Figure 2C:
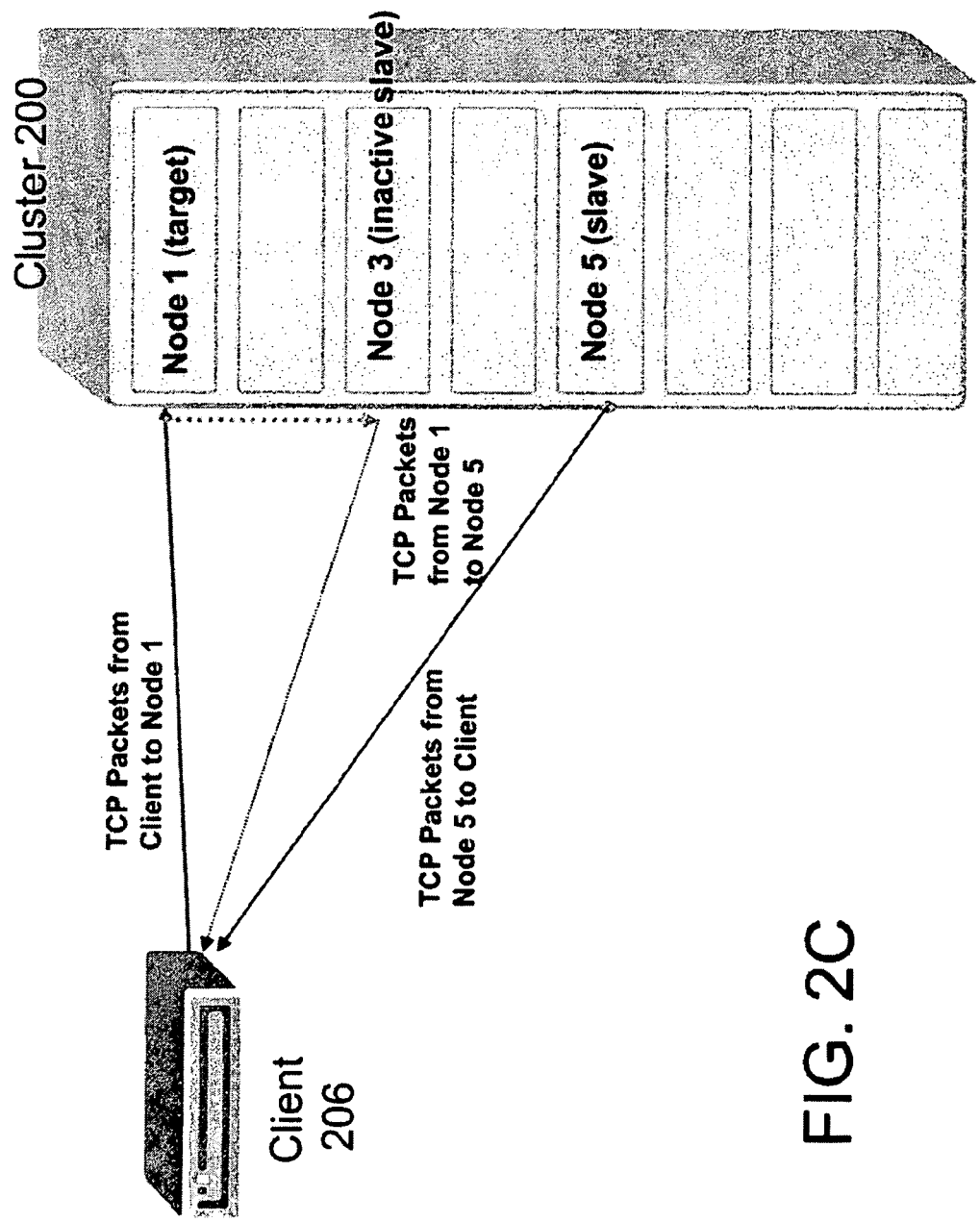
Figure 3:
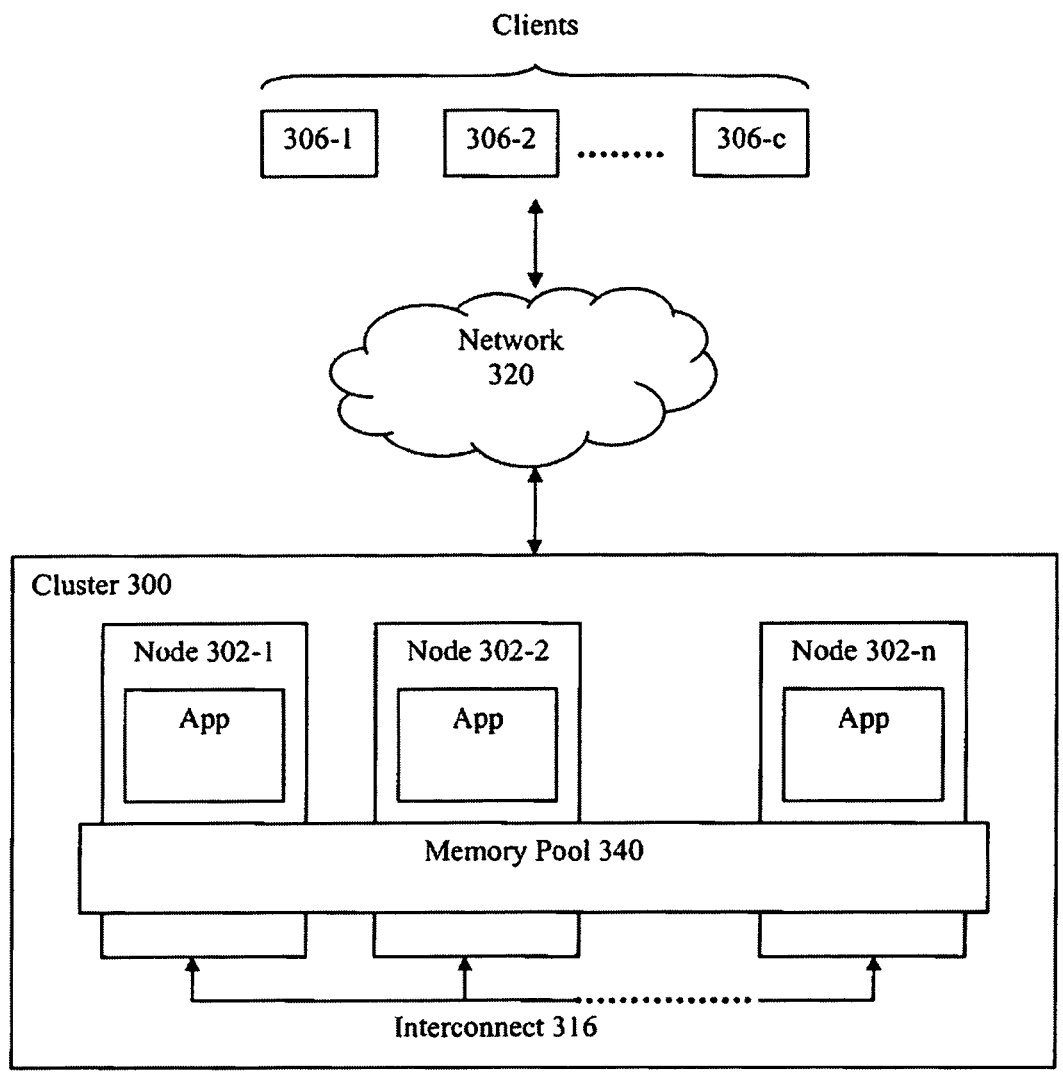
FIG. 3 is a block diagram illustrating an example architecture implementation of the present invention.

FIG. 3 illustrates an example architecture that can implement various aspects of the invention. In this example implementation, the present invention provides mechanisms for maintaining high performance and efficient handling of communications between clients 306 and a cluster 300 of RAM-based nodes 302 in a network 320. It should be noted, however, that although network communications and protocols are an aspect of the invention, certain or all of clients 306 need not be remotely located from either each other or cluster 300. Moreover, additional networks and/or network elements may be interposed between clients 310 and/or cluster 300.

Network 320 is an Ethernet in a NAS example, or a Fibre Channel in a SAN example. Hardware from Fibre Channel vendors including Cisco, Emulex, Brocade, McData, QLogic, LSI Logic, and Vixel can be used in a Fibre Channel example. As mentioned above, other types of wired and wireless networks and connections, as well as combinations of disparate types of networks, are possible.

Clients 306 are typically implemented by NFS client processes hosted by compute servers such as high-performance servers running OLTP, batch processing, and other intensive operations under Apple OS X, AIX, Solaris, Linux, and Windows environments, for example. One example of compute servers that can be used include the DL145 from Hewlett Packard.

Cluster 300, in this example, is comprised of a cluster of nodes 302-1 to 302-n. The nodes are interconnected by a standard interconnect 316, for example Gigabit Ethernet, which is used to exchange management and control information between nodes 302, as will become more apparent below. It should be noted that, although the techniques of the invention will be described in connection with a preferred embodiment of a cluster architecture utilizing protocols such as TCP/IP and NFS, the invention is not limited to these protocols, and can be extended to other architectures and other protocols, including those described above.

In one example, nodes 302 are comprised of 64-bit blade servers such as ScaleOut series blades from Rackable Systems, each having 32 GBytes of system memory (e.g. RAM). The memories of the individual blades are combined together in a manner such as that described in co-pending U.S. application Ser. No. 11/365,474 to form a single large (e.g. up to 5 TB) and scalable memory pool 340. It should be noted that nodes 302 and/or clusters of elements need not be implemented using exactly the same type of blade server or other computing element, as long as they are capable of supporting and/or executing an application as described below.

Figure 4:
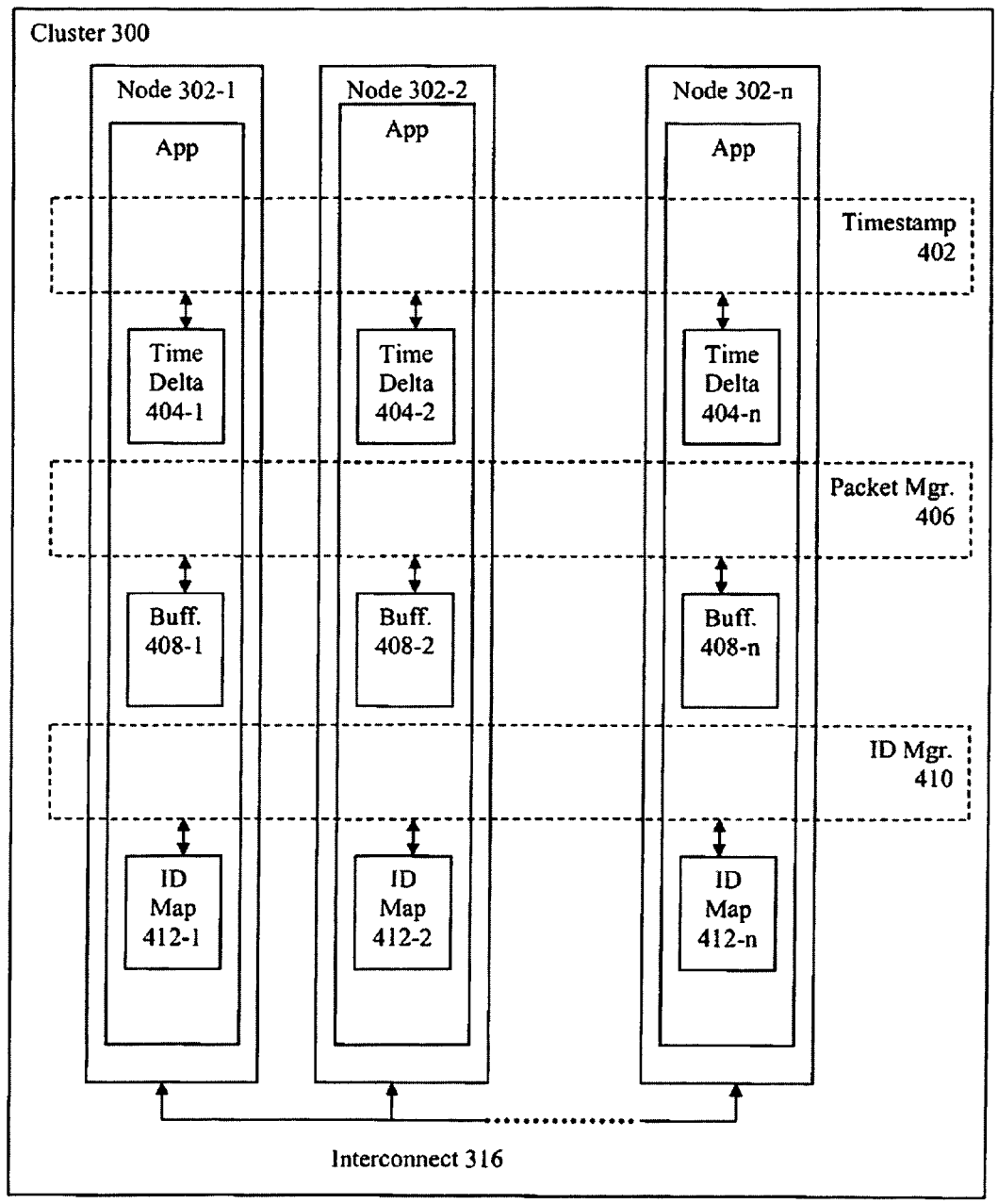
FIG. 4 is a block diagram illustrating an example implementation of a cluster having connection migration mechanisms according to aspects of the invention.

More particularly, as shown in FIG. 3, each node 302 further includes a common custom application. An example implementation of this custom application is illustrated in FIG. 4. As illustrated, each application communicates with other applications via interconnect 316 to thereby together implement a timestamp mechanism 402, a packet management mechanism 406, and a connection ID management mechanism 410. In one example implementation, the application executes in an embedded Linux or VxWorks environment. Those skilled in the art will be able to understand how to implement the functionality of mechanisms 402, 406 and 410 in such an environment after being taught by the example descriptions below.

It should be noted that nodes 302 can contain additional functionality and components not shown in FIGS. 3 and 4, including both conventional and proprietary functionality and components, and/or functionality and components such as those described in co-pending U.S. application Ser. No. 11/845,679 (GSX-006), incorporated herein by reference. However, such additional functionality and components are not shown or described in detail herein for clarity of the invention. It should be further noted that the application need not include all of mechanisms 402, 406 and 410, but that the invention can be practiced by systems having any combination of one or more of any of these mechanisms.

According to an aspect of the invention, TCP timestamp mechanism 402 enables all timestamps associated with a given connection to remain consistent, even when the connection is migrated between nodes in the cluster and the nodes have different local clock values, clock hardware and/or are not otherwise synchronized. In general, the mechanism 402 executing across all nodes operates as follows. Upon a TCP connection migration, the mechanism 402 executing in the previous socket owner node 302 sends its latest timestamp value associated with this connection to the mechanism 402 executing in the current socket owner node 302. Mechanism 402 in the current socket owner node calculates the difference between this received timestamp value and its current clock value and stores the difference in time delta store 404. Accordingly, each store 404 contains a table of the timestamp deltas for each TCP connection that the respective node owns. The local clock on the current socket owner node 302 operates as normal. Meanwhile, mechanism 402 in the current socket owner node uses the values in store 404 to adjust this local clock value by the calculated time difference whenever a timestamp is needed for any of the connections it owns and for which it stores a difference value in 404. By doing this, both the sender and receiver will have a consistent view of the timestamps for a given connection no matter what the local clock value is and how many times the socket has been migrated.

Figure 5:
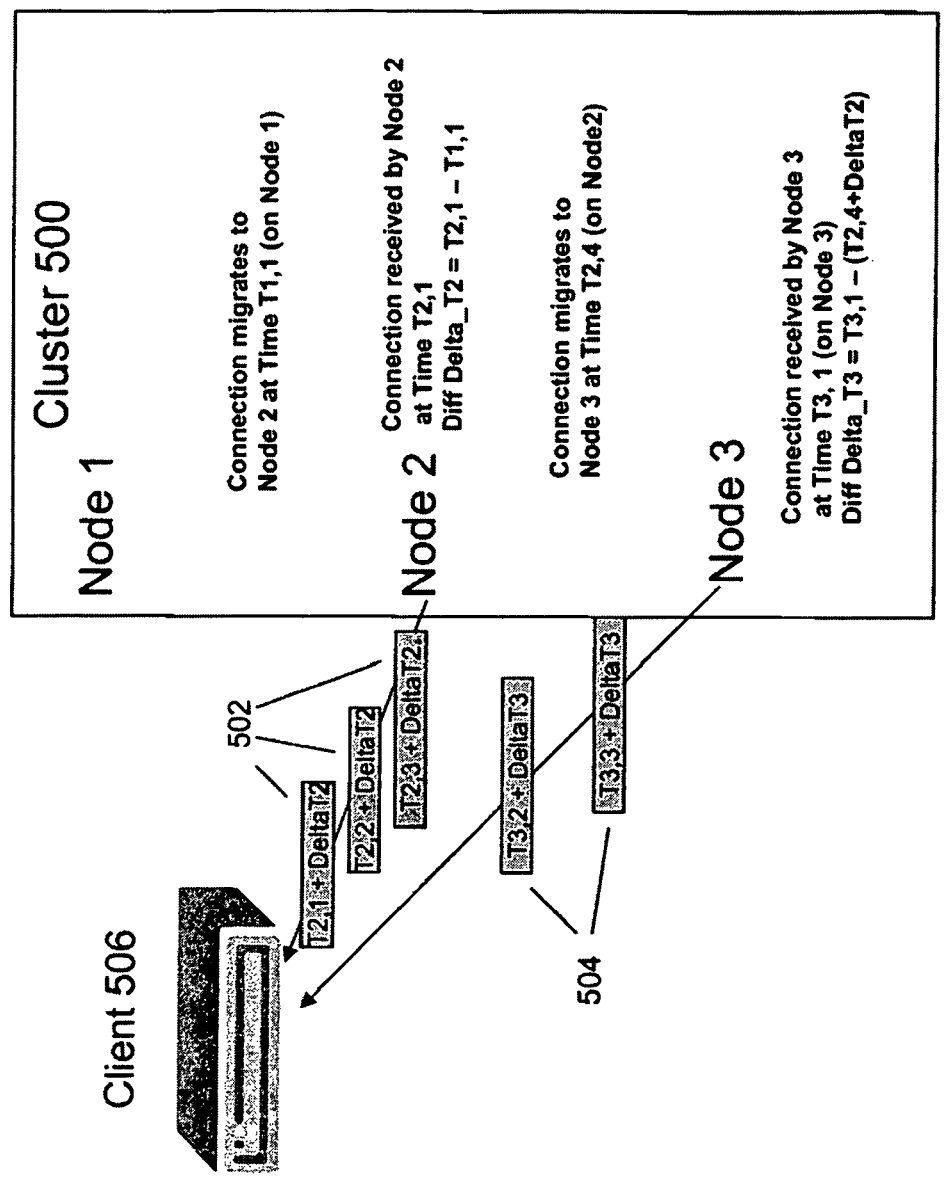
FIG. 5 is a diagram illustrating one example connection migration mechanism according to the invention.

This aspect is illustrated in more detail in FIG. 5. When a connection is first migrated from Node1 to Node2 in cluster 500, Node1 sends its current timestamp (T1,1) to Node2. Node2 computes the difference between this timestamp and its current local time (T2,1) as Delta_T2=T2,1−T1,1. This difference value is stored in Node2's local store 404 and added to the current local time to generate timestamps for any outgoing packets it sends to the client. Accordingly, as shown in FIG. 5, when Node2 sends packets 502 at three different times T2,1, T2,2 and T2,3, its mechanism 402 adjusts the timestamps for each packet by the same difference value Delta_T2.

As further shown in FIG. 5, when the connection migrates again from Node2 to Node3, Node2 sends its current timestamp value for this connection, which is its current time (T2,4) plus the current difference value (Delta_T2) in its local store 404, to Node3. Node 3 computes a new difference value with its own current local time (T3,1) as Delta_T3=T3,1−(T2,4+Delta_T2), and stores this difference value in Node3's local store 404. This difference value can then be added to any outgoing packets it sends to the client for this connection. For example, as shown in FIG. 5, when Node3 sends packets 504 at two different times T3,2 and T3,3, its mechanism 402 adjusts the timestamps for each packet by the same difference value Delta_T3.

It should be noted that this process can be repeated with each new connection migration, thereby guaranteeing consistency throughout the connection. Moreover, in a preferred implementation, if the connection returns to the original node, the timestamps do not revert to the timestamps on that node. Rather, the delta process is maintained. This will likely ensure that the client sees a monotonically increasing sequence of timestamps for all traffic coming from cluster 500 for this connection.

According to additional aspects of the invention, and referring back to FIG. 4, packet management mechanism 406 ensures that packets do not get lost during a connection migration and re-migration. In general, the mechanism 406 executing across all nodes operates as follows. Mechanism 406 executing in each target node in a TCP connection keeps a buffer 408 of the latest packets received from a client associated with the connection after the connection has been migrated to another node. Each time the connection is migrated again, in addition to updating the slave node for forwarding all future packets related to the connection, the target node sends the contents of buffer 408 to the new slave node using a retransmit operation. Mechanism 406 in the target node also specially tags the packets from buffer 408 so that the receiving slave can distinguish target node retransmitted packets from client retransmits.

Figure 6A:
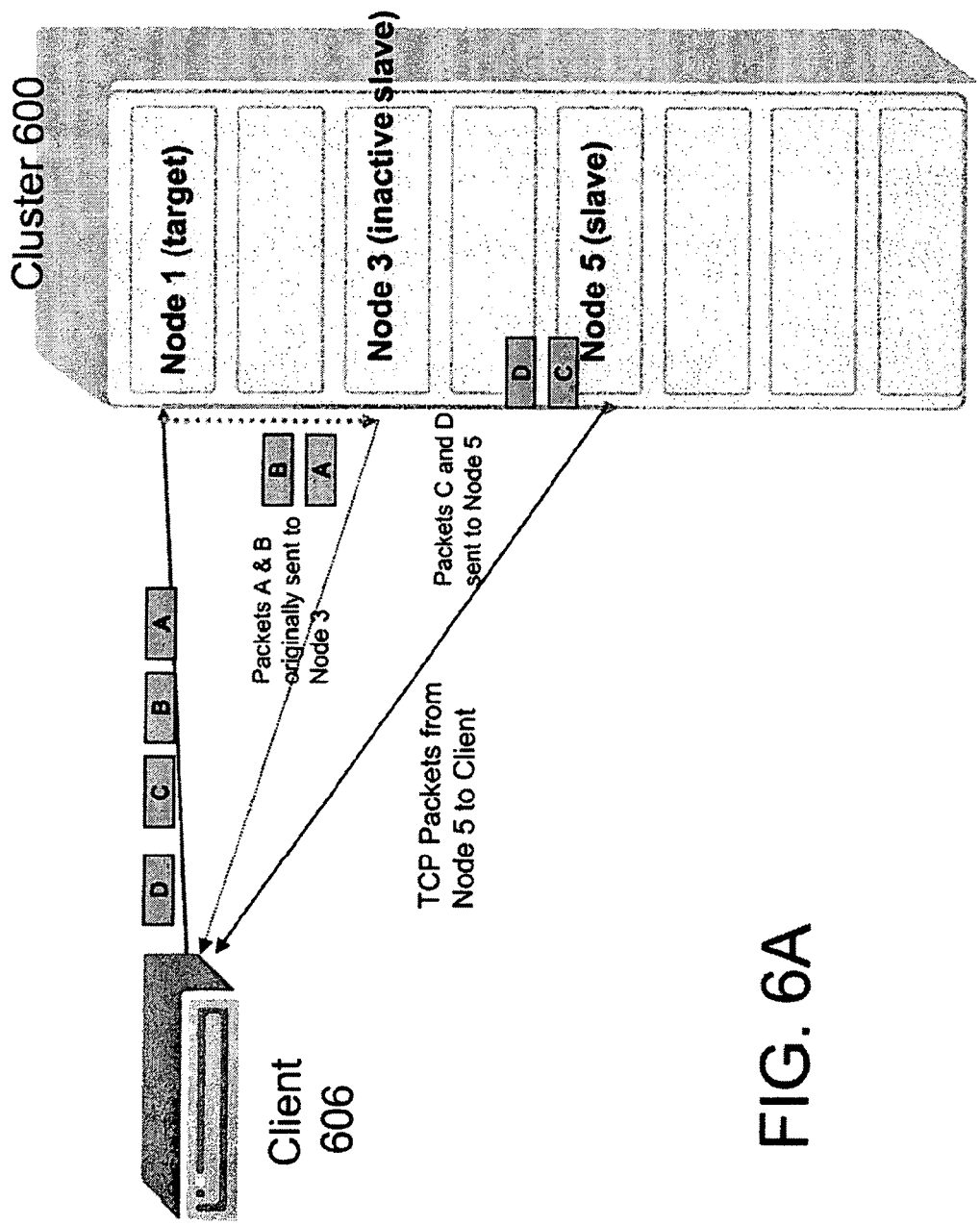
FIGS. 6A and 6B are diagrams illustrating another example connection migration mechanism according to the invention.
Figure 6B:
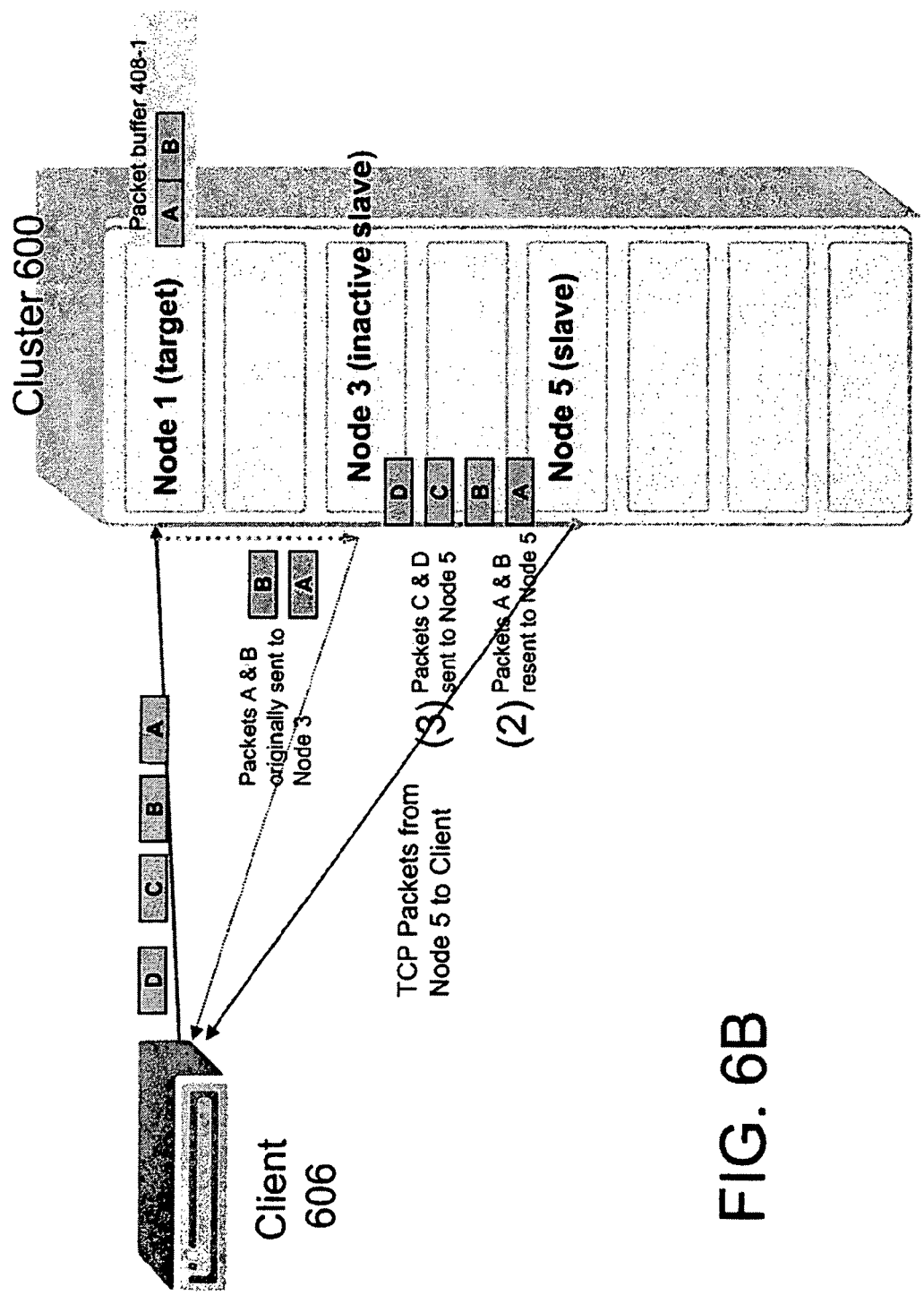

The lost packets problem addressed by this aspect of the invention is illustrated in FIGS. 6A and 6B. In this example, client 606 begins a TCP connection with Target Node 1 of cluster 600. Before receiving packet A, the connection migrates to Slave Node 3. Target Node 1 forwards packet A to node 3. Since node 3 has the TCP connection, it processes packet A. Client 606 then sends packet B to node 1 (target), which forwards the packet B to Node 3. However, before node 3 can process the packet, the TCP connection has migrated from Node 3 to Node 5. So when Node 3 receives packet B, it ignores it. Thereafter, Node 1 (target) forwards packets C and D to Node 5 when they are received from client 606. So Packet B is effectively "lost" and client 606 will need to re-send it, thereby degrading performance.

A solution to this problem according to the invention is illustrated in FIG. 6B. As shown in FIG. 6B, the packet management mechanism 406 in Target Node1 maintains packet buffer 408-1 of the "N" most recently received packets it has received for a given connection, even after the connection is migrated to Slave Node3. After the connection is re-migrated to new Slave Node5, in addition to updating its handoff mechanism to forward all future packets to Slave Node5, the Target Node1 retransmits the packets in buffer 408-1 to the new slave Node5 The packets from buffer 408-1 are tagged with a special flags or labeling so that Node5 can distinguish these packets from normal re-transmitted packets, and discard any that it does not need. For example, mechanism 406 in Target Node1 can insert labeling in the headers of packets from 408-1 that can allow mechanism 406 in Node5 to identify them as being resent by the target rather than by the client itself. This can be important because packets retransmitted by the client have special meaning to the slave node, such as for assessing levels of network congestion and adjusting packet transmission rates. All subsequent packets sent by the client 606 are forwarded to the new slave Node5 by target Node1 as normal.

It should be noted that the buffers 408 need not have a fixed or the same size, but could be variably sized, for example to contain all packets in the last N seconds, or some combination of thresholds of time and size, etc. It should be further understood that TCP streams operate via increasing sequence numbers. As such, the receiving node always knows which bytes of information it is expecting next. The receiving (slave) node will look through the retransmitted packets sent to it by the target, and extract out only the ones it needs. Any packet it does not need is discarded. If some packets are still missing, the receiving slave node can note that fact and expect those packet to arrive as a future retransmission from the client.

Figure 7A:
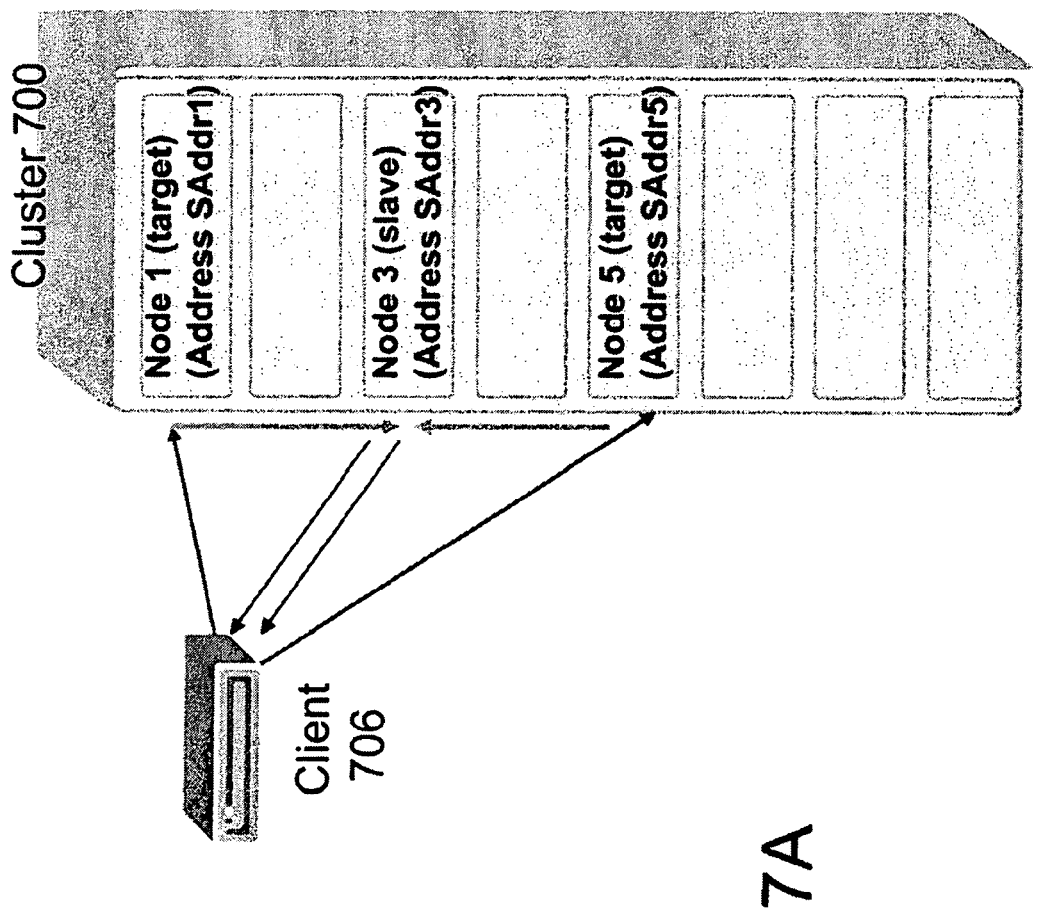
FIGS. 7A and 7B are diagrams illustrating another example connection migration mechanism according to the invention.

According to another aspect of the invention, connection ID management mechanism 410 allows cluster nodes to uniquely identify TCP connections in the midst of multiple connection migrations. The connection identity problem addressed in this aspect of the invention is illustrated in FIG. 7A. Client 706 (using IP source address Client_addr and source port number Client_port) starts a first TCP connection with Node 1 (using, for this connection, an IP address of SAddr1—each node can use several different IP addresses) of cluster 700 using a well-known and commonly used destination port number service_port, and so packets related to this connection are thus identified with the 4-tuple <Client_addr, Client_port, SAddr1, service_port>. If this TCP connection is migrated to node 3, the packets sent to cluster 700 by client 706 that are forwarded from Node 1 to Node 3 are identified as <Client_addr, Client_port, SAddr3, service_port>.

As further shown in FIG. 7A, Client 706, using the same source IP address and port number as in the first connection, also has a second TCP connection with Node 5 (using, for this connection, an IP address of SAddr5) of cluster 700, also using the well-known and commonly used destination port number service_port, and so packets related to this connection sent from client 706 are identified with the 4-tuple <Client_addr, Client_port, SAddr5, service_port>. If this second TCP connection is also migrated to Node 3, the packets from client 706 to cluster 700 that are thereafter forwarded from Node 5 to Node 3 are also identified as <Client_addr, Client_port, SAddr3, service_port>. Accordingly, while both the first and second migrated connections with client 706 are simultaneously active, Packets from Node 1 and Node 5 for different TCP connections involving the same client 706 will be indistinguishable from each other, causing an identification conflict on Node 3.

In general, the mechanism 410 executing across all nodes operates as follows. Mechanism 410 executing in each target node of each migrated TCP connection re-writes the destination port field of the IP packet header inserted by the client for all packets it forwards to the slave node with a special port number. Mechanism 410 executing in the slave node decodes the special port number with a known algorithm to determine the original source address that the client communicated to. The algorithm insures that the special port number and resulting four tuple will be unique for every target node, even when the client communicates with multiple target nodes using the same client side port.

Figure 7B:
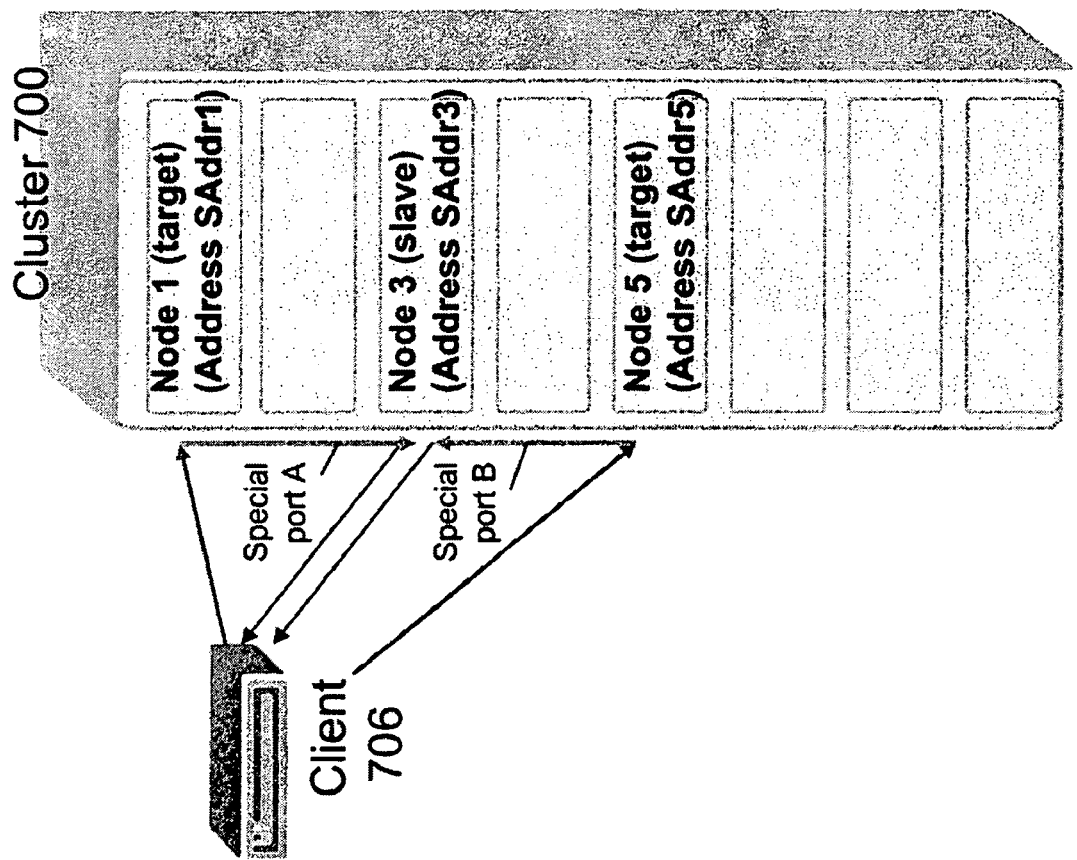

One example implementation of mechanism 410 according to this aspect of the invention is illustrated in FIG. 7B. As before, when client 706 starts a TCP connection with Node 1, packets are identified with the 4-tuple <Client_addr, Client_port, SAddr1, service_port>. However, when this connection is migrated to node 3, packets forwarded from Node 1 to Node 3 are identified as <Client_addr, Client_port, SAddr3, special_port_a>, wherein the value for special_port_a is generated from an algorithm known across all mechanisms 410 in all nodes. Likewise, when Client 706 starts a TCP connection with node 5, packets are identified with the 4-tuple <Client_addr, Client_port, SAddr5, service_port>. If this connection is also migrated to node 3, Packets forwarded from Node 5 to Node 3 are identified by mechanism 410 in Node 5 as <Client_addr, Client_port, SAddr3, special_port_b>. The value for special_port_b is computed from the source address by mechanism 410 using the same known algorithm referred to above. The mechanism 410 in Node 3 can then decode the original source addresses from the destination port values of special_port_a and special_port_b using the known algorithm. Moreover, because packets forwarded from Node 1 and Node 5 have different port addresses, they no longer conflict on Node 3.

In one example implementation of mechanism 410, the known algorithm operates as follows. Each node in cluster 700 can host connections having one or more virtual IP addresses associated with the cluster (e.g. SAddr1, SAddr2, etc.), and each node can use one or more of these IP addresses. Each virtual IP address maps to a unique SourceID, and this complete mapping between virtual addresses and Source IDs is known and shared among all ID maps 412 in cluster 700.

The unique SourceID is used to generate the value of the special_port number. For example, when a connection is to be handed off, the special_port is generated by mechanism 410 in the target node as special_port=base_value+SourceID, where the SourceID maps to the original source address that the client connected to. The base_value is a fixed value chosen to control the port ranges that the special ports map to. The unique SourceID for a virtual address is chosen so that all nodes of the cluster will translate a given SourceID into exactly the same source address. When the slave node receives the packets from the target node, its mechanism 410 uses the special_port number to derive the SourceID, which it can then use to determine the source address.

It should be understood that the above-described example algorithm is just one of many possible implementations, and those skilled in the art will appreciate various alternative implementations that will yield a solution for mapping source addresses to unique port numbers.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
receiving a first network connection to a client at a first node of a storage cluster;
first migrating the first connection to a second node of the storage cluster;
receiving a second network connection to the client at a third node of the storage cluster;
second migrating the second connection to the second node of the storage cluster while the first connection is also migrated to the second node;
ensuring jointly at the first, second, and third nodes:
that timestamps associated with the connection continue to monotonically increase after the migrations;
that packets associated with the connection are not dropped within the storage cluster after the second migration;
that packets associated with the network connection do not conflict with other packets associated with a different network connection after the first migration, and after a concurrent third migration of the different network connection to the second node,
wherein the client uses a virtual IP address for connection with the storage cluster, and wherein the migration occurs transparently to the client.

2. The method of claim 1, wherein the connections are TCP connections.

3. The method of claim 1, wherein the ensuring step includes:
maintaining a plurality of received packets associated with the connection at the first node after the first migration; and
sending the maintained plurality of received packets to the third node after the second migration.

4. The method of claim 1, wherein the ensuring step includes:
overwriting header values in the first and second packets at the first and third nodes, respectively, wherein the overwriting step includes:
obtaining different unique identifiers associated with the first and second connections, respectively; and
adjusting a port number in the first and second packets using the different unique identifiers, respectively.

5. A storage apparatus comprising:
a first node that receives a network connection to a client;
second and third different nodes capable of handling the network connection;
a handoff mechanism that causes the network connection to the client to be first migrated from the first node to the second node, and if necessary, second migrated from the second node to the third node; and
an application running in the first, second and third nodes that jointly ensures:
that timestamps associated with the connection continue to monotonically increase after the migrations,
that packets associated with the connection are not dropped within the storage cluster after the second migration, and
that packets associated with the network connection do not conflict with other packets associated with a different network connection after the first migration, and after a concurrent third migration of the different network connection to the second node,
wherein the client uses a virtual IP address for the network connection with the nodes, and
wherein the first and second migrations occur transparently to the client.

6. The apparatus of claim 5, wherein the connections are TCP connections.

* * * * *